INVENTORS.
Edward R. Sederlund
BY Walter J. Schrenk
AGENT

United States Patent Office 3,581,344
Patented June 1, 1971

3,581,344
APPARATUS FOR THE PREPARATION OF BIAXIALLY ORIENTED FILM
Edward R. Sederlund, Saginaw, and Walter J. Schrenk, Bay City, Mich., assignors to The Dow Chemical Company, Midland, Mich.
Original application Aug. 21, 1967, Ser. No. 662,028, now Patent No. 3,472,924, dated Oct. 14, 1969. Divided and this application May 16, 1969, Ser. No. 825,311
Int. Cl. B29d 23/04
U.S. Cl. 18—14      8 Claims

ABSTRACT OF THE DISCLOSURE

Biaxially oriented thermoplastic resinous film is prepared by extruding a tube, stretching the tube by means of generally coaxially arranged tori, at least the outermost torus being driven in frictional engagement with the film being prepared.

---

This application is a divisional application of our copending application Ser. No. 662,028, filed Aug. 21, 1967, now Pat. No. 3,472,924.

This invention relates to an improved apparatus for the preparation of biaxially oriented synthetic resinous film, and more particularly relates to an apparatus for the preparation of biaxially oriented synthetic resinous film wherein a tube is extruded and stretched under conditions which are controlled principally by means other than the characteristics of the extruded tube.

Oriented synthetic resinous film is usually prepared by one of three methods: (a) tentering, wherein a flat sheet is extruded and the extruded sheet stretched longitudinally (machine direction) and transversely (transverse direction) by means of a tenter frame which may accomplish the stretching in one or more separate operations. Generally, close control of the orienting conditions is possible as the film or sheet is mechanically restrained and can be maintained at optimum orienting temperatures. As a portion of the sheet must be grasped by clamps, clips or other mechanical arrangement, a significant portion of the extruded sheet must be subsequently discarded as scrap or be reprocessed; (b) the bubble process, wherein a tubular film is extruded and stretched by means of a trapped bubble of gas within the tube sometime after extrusion from a die or over a mandrel which requires some form of lubrication, usually gaseous. The bubble process in general suffers from the disadvantage that the orientation introduced into the bubble is generally dependent upon the ability of the bubble to withstand internal pressure developed by the gas whether a mandrel is employed or not, as it is generally necessary to introduce gas pressure adjacent the extrusion die. When employing a mandrel, frequently the temperature of the tube adjacent the mandrel and the temperature of the surface remote from the mandrel are unlike resulting in undesired characteristics. Frequently, unlike surfaces and unequal orientations in the machine and transverse directions are obtained in this manner; (c) chill roll casting, wherein film is extruded from a slot die and deposited on a roll having a surface temperature generally below the thermoplastic temperature of the material being extruded. Employing the chill roll casting process, frequently only machine direction orientation is obtained which prevents obtaining maximum physical properties from the resinous material.

It would be advantageous if there were available an improved apparatus for the preparation of synthetic resinous film which would permit controlling the orientation of the product and permit orientation at the desired temperature and which did not produce undesired scrap.

It would also be advantageous if there were an apparatus available for the production of synthetic resinous film which would permit orientation of the extruded tube in a manner which is relatively independent of the melt characteristics of the film.

It would also be beneficial if there were available an improved apparatus for the production of biaxially oriented synthetic resinous film which was capable of closely controlling the ratio of orientation between machine direction and transverse direction.

These benefits and other advantages in accordance with the present invention are achieved in an apparatus for the biaxial stretching of deformable tubes, the apparatus comprising in cooperative combination a first torus and a second torus, the first torus having a lesser diameter than the second torus, each torus having a surface, an axis of generation and a circle of generation, the first and second tori having generally coaxial axes of generation and means to rotate the surfaces of the tori about the circle of generation wherein the rotation of the surface has a component of motion lying in a plane containing the axes of generation.

Further features and advantages of the present invention will become more apparent from the following specification taken in connection with the drawing wherein.

Figure 1:
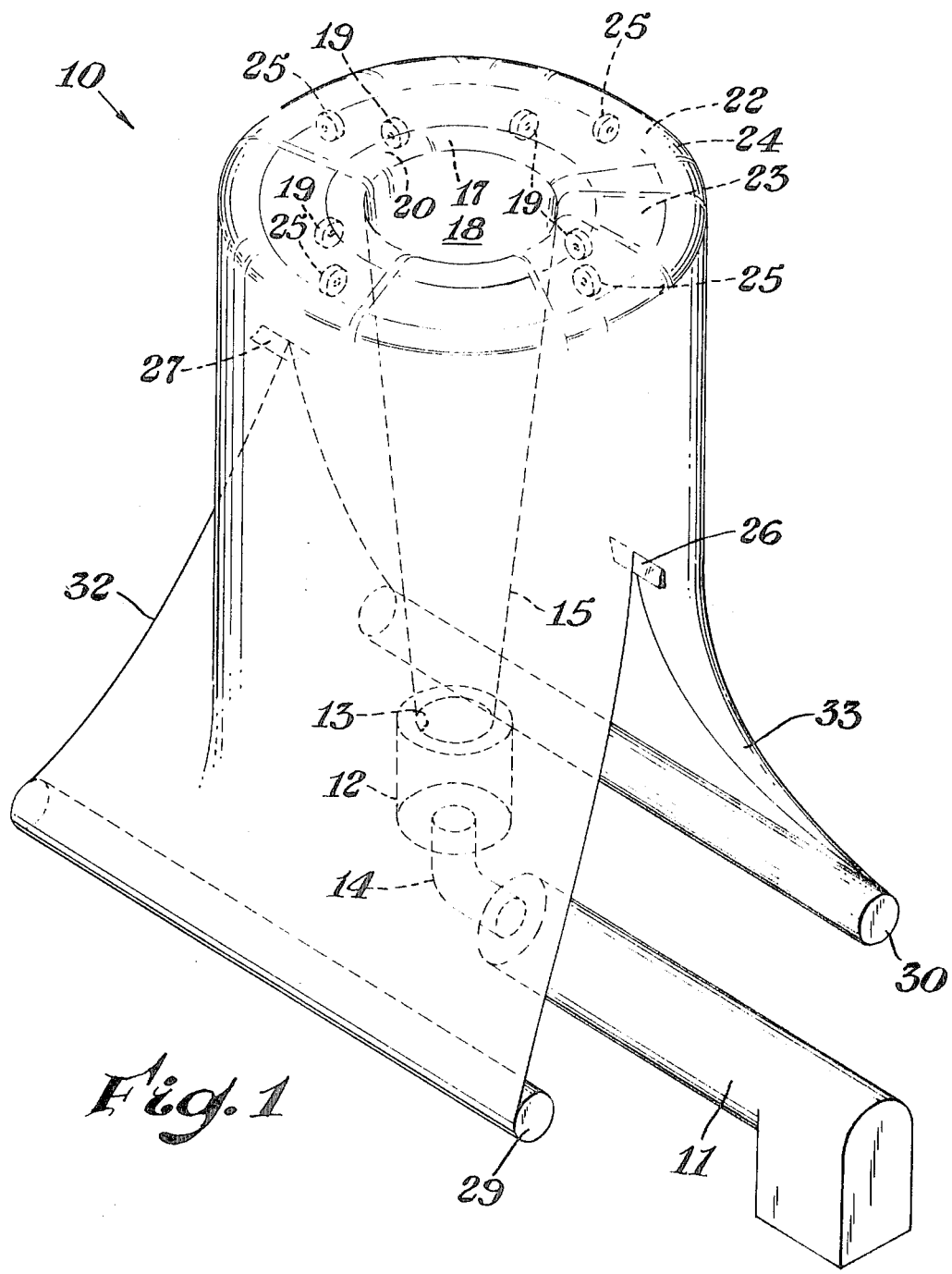
FIG. 1 is a schematic representation of an apparatus for the preparation of biaxially oriented resinous film in accordance with the present invention.

In FIG. 1 there is schematically represented an apparatus in accordance with the present invention generally designated by the reference numeral 10. The apparatus 10 comprises in cooperative combination an extruder 11 adapted to supply a stream of heat plastified film-forming synthetic resinous material. A die 12 is in operative combination with the extruder 11 by means of a supply conduit 14. The die 12 defines an annular extrusion orifice 13. A tube 15 of heat plastified synthetic resinous film issues from the orifice 13 of the die 12. A first torus 17 having an axis of generation and a generating circle (not shown) is disposed in spaced relationship to the die 12 and is generally concentric with an axis of the tube 15 and parallel to the extrusion orifice 13. The torus 17 defines a first inner space 18. The first torus 17 is in operative combination with peripherally located support and driving means 19. The driving means 19 are disposed generally about the outer periphery of the torus 17. The torus 17 defines an outer surface 20 adapted to rotate in such a manner that a major component of motion lies in a plane containing the axis of generation of the torus; that is, the surface of the torus rotates inwardly and outwardly about the circle of generation. A second torus 22 is generally coaxially disposed with relationship to the first torus 17 and is generally parallel thereto. The second torus 22 defines an inner space 23 and an external surface 24. The surface 24 is adapted to rotate about the circle of generation in a manner similar to the surface 20 of the first torus 17. The second torus 22 is in operative engagement with the support and drive means 25 spaced about the inner periphery of the torus 22 and in operative engagement with the surface 24 of the torus 22. First and second slitting means 26 and 27 are disposed on opposite sides of the axes of generation of the tori 17 and 22 and generally at a location between the die 12 and the outer periphery of the torus 22. First and second windup rolls 29 and 30 are disposed on opposite sides of the die 12. The tube 15 passes from the annular opening 13 of the die 12 to the inner space 18 defined by the torus 17. The tube 15 is then passed more or less radially outwardly from the axes of generation of the tori over the surface 20 of the torus 17 to the surface 24 of the torus 22. The tube 15 then essentially reverses its original direction, contacting the slitting members 26 and 27 which slit the tube into a pair of separate sheets 32 and 33 which are wound onto the takeup rolls 29 and 30.

The illustration of FIG. 1 is purely schematic and omits much mechanical detail such as heaters or heating enclosures employed to provide optimum stretching temperature. The tori 17 and 22 are driven in such a manner that their surfaces rotate about the circle of generation providing stretch both in the machine direction; that is, the direction of extrusion, and the transverse direction. The term "circle of generation of the torus" refers to the circle traced about the axis of generation of the torus by the center of the circle which, on rotation about the axis of generation, generates the torus. The tori 17 and 22 may be coplanar or positioned in generally parallel spaced apart planes, depending on the ratio of machine and transverse orientation desired. The apparatus as schematically illustrated in FIG. 1 permits temperature adjustment of the extruded film to the optimum orientation temperature which is independent of the physical characteristics of the freshly extruded tube 15 adjacent the die 12.

Figure 2:
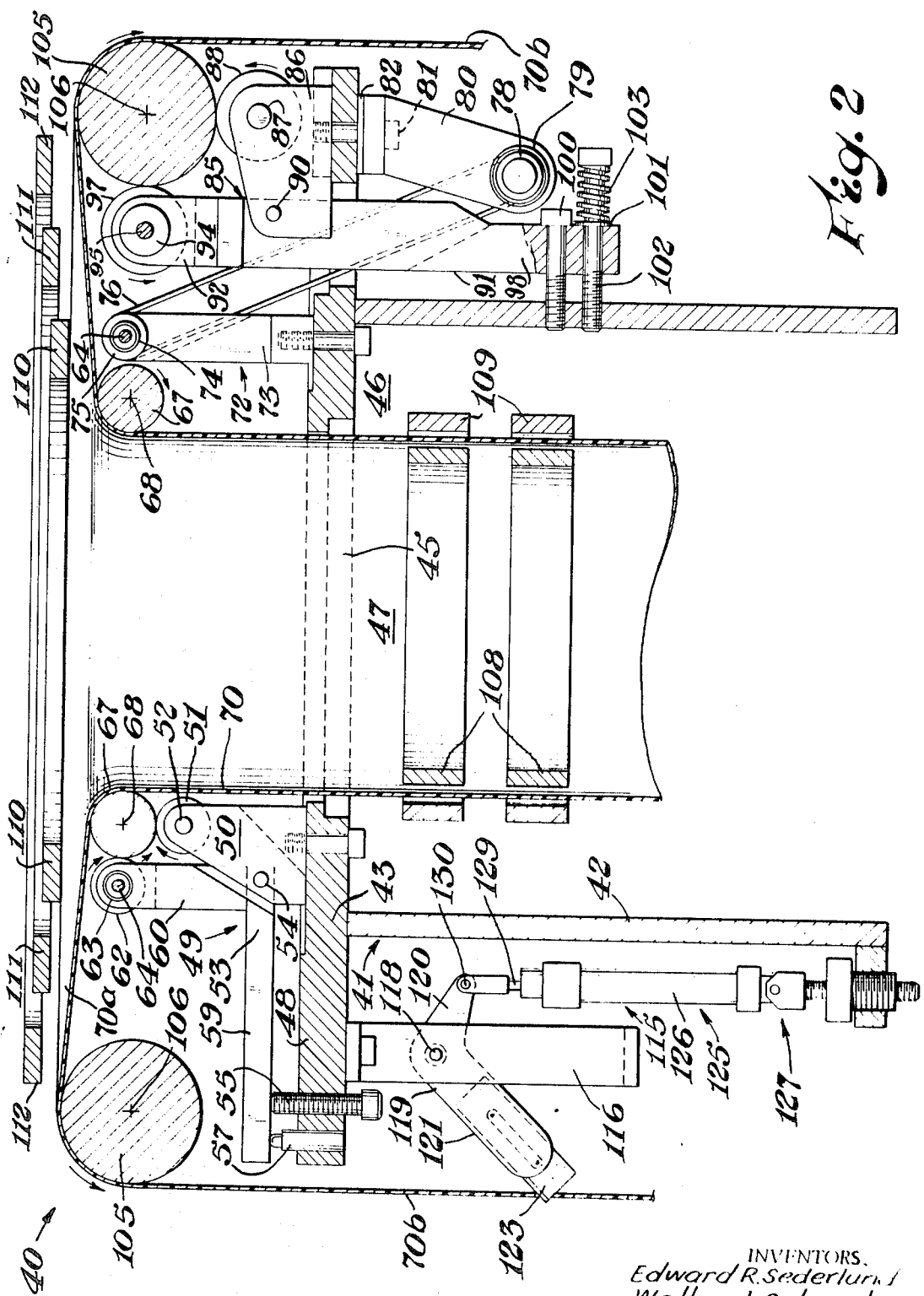
FIG. 2 is a cross-sectional view of a stretching apparatus in accordance with the present invention.

In FIG. 2 there is depicted a cross-sectional fractional view of an apparatus in accordance with the invention generally designated by the reference numeral 40. The apparatus 40 comprises in cooperative combination a frame 41. The frame 41 comprises a generally hollow cylindrical body portion 42 having affixed thereto a support bed or flange 43. The flange 43 defines a generally centrally disposed opening 45 providing access to the space 46 enclosed by the body portion 42. The body portion 42 and the opening 45 of the flange or base 43 define a film passageway 47 adapted to pass tubular film therethrough. Remote from the body 42 and disposed on a surface 48 of the flange or base 43 are a plurality of first torus support assemblies 49 (one shown). The torus support assembly 49 comprises a support 50 secured to the surface 48. The support 50 has rotatably mounted therein remote from the surface 48 an idler support roll 51. The support roll 51 is carried upon a bearing 52 secured to the support 50. The idler support roll 51 is adapted to rotate in a plane containing an axis of a circular tube generally similarly disposed within the opening 45. The support 50 has pivotally mounted therein a bell crank or drive roll support 53. The drive roll support 53 is pivotally affixed to the support 50 by a pivot 54 and is adjustably supported on the base 43 by an adjusting means or positioning screw 55 and a tension means or spring loaded plug 57 in engagement with a first arm 59 of the bell crank 53. A second arm 60 of the bell crank 53 has rotatably fixed thereto a drive roll 62. The drive roll 62 is supported by a bearing 63 and is adapted to rotate within the plane of rotation of the idler roll 51. A toroidal flexible drive shaft 64 is in operative engagement with the drive roll 62 and connected to a plurality of drive rolls 62 not shown and disposed in generally radial arrangement about the axis of a tube passing upwardly through the opening 45. A torus 67 is in conntact with the drive roll 62 and the idler roll 51. The torus 67 has a center of rotation 68 which lies on the circle of generation of the torus. The angle formed by the center of rotation 68, the drive roll 62 and the idler roll 51 is about 90° and preferably somewhat greater. A portion 70 of a tubular film is shown disposed within the passageway 47 passing upwardly and over the torus 67 which rotates in the direction indicated by the arrow. Oppositely disposed from the torus support assembly 49 is a first torus drive assembly generally designated by the reference numeral 72. The drive assembly 72 comprises a frame or support 73 supported by the surface 48 of the base or flange 43. Remote from the base 43 the support 73 carries a bearing 74. The bearing 74 supports the toroidal flexible shaft 64 to which is affixed a driving means or pulley 75. The driving pulley 75 is in operative engagement with the rotating means or belt 76 which in turn is in operative communication with a pulley 78 supported on a gear head motor 79. The motor 79 is carried by a bracket 80 which in turn is adjustably mounted to the base 43 remote from the surface 48 by means of a mounting bolt 81. Belt tension and adjustment are achieved by the use of a shim 82. Rotation of the pulley 78 by the motor 79 causes the belt 76 to rotate the toroidal flexible shaft 64 which in turn causes rotation of a plurality of radially spaced drive rolls 62 which are in frictional engagement with the torus 67. A frictional force between the torus and the drive roll 62 causes at least the outer surface of the torus to rotate in the direction indicated by the arrows. Thus, the film 70 is frictionally engaged by the surface of the torus 67 and urged in a generally radially outward direction. A plurality of second torus support assemblies 85 (one shown) are disposed on a circle outwardly from the first torus support assemblies 49. The second torus support assembly 85 comprises a support 86 having secured therein a pivot 87. The pivot 87 carries a rotatable idler roll 88. The idler roll 88 is adapted to rotate in a plane passing through the axis of the tube 70; that is, a radial plane. The support 86 has affixed thereto a second pivot 90 which lies radially inwardly from the pivot 87 and carries a drive roll support arm 91. The drive roll support arm 91 has a first end 92. The first end 92 has disposed therein a bearing 94. The bearing 94 supports a toroidal flexible drive shaft 95 which has concentrically mounted thereon a drive roll 97. The arm 91 has a second end 98 having a positioning means or adjustment screw 100 and a resilient tensioning means 101 comprising a cap screw 102 and a compression spring 103 adapted to force the second end 98 toward the body 42 and consequently tension the drive roll 97 in a radially outward direction. A second torus 105 is in operative engagement with the drive roll 97 and the idler roll 88. The torus 105 has a center 106 which is coextensive with the circle of generation of the torus and at least the outer surface of the second torus 105 is capable of rotating about its circle of generation indicated by the reference numeral 106. The smallest angle formed by the centers of the rolls 97 and 88 and the center 106 beneficially is slightly greater than 90°. The tubular film 70 passes over the first torus 67 into a stretching region lying between the first and second tori 67 and 105, respectively, and the film in this region is designated as 70a. The film passes over the second torus 105 and is still in tubular form as indicated by the reference numeral 70b. A plurality of internal annular heating elements 108 are disposed within the passageway 47 and are adapted to supply heat to the inner surface of the tubular film 70. A plurality of external annular heaters 109 are also disposed within the passageway 47 and are adapted to supply heat to the external surface of the film. The heaters 108 and 109 are in operative combination with support means and power supply means, not shown. A plurality of annular discoidal heaters 110, 111 and 112 are disposed generally adjacent the film 70a in the stretching zone lying between the first torus 67 and the second torus 105. A slitting assembly 115 is supported external to the body 42. The slitting assembly 115 comprises a support member 116 supported from the base or flange 43. The support member 116 carries a pivot 118 which in turn supports a bell crank 119. The bell crank 119 has a first leg 120 and a second leg 121. Remote from the pivot 118, the leg 121 has adjustably secured thereto a slitting knife 123 shown in operative engagement with the film 70b. The first end 120 of the bell crank 119 remote from the pivot 118 is in operative connection with a linear actuator 125 comprising a cylinder 126 adjustably and pivotally secured to the body 42 by a connector assembly 127. The linear actuator 125 has a distendable piston rod 129 which is pivotally secured to the first leg 120 of the bell crank 119 by a pivot 130.

Figure 3:
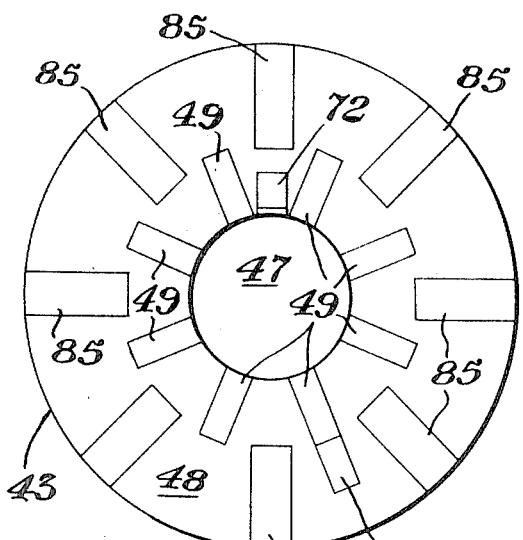
FIG. 3 is a plan view of a portion of the apparatus of FIG. 2.

FIG. 3 is a schematic representation of a top view of the apparatus of FIG. 2 schematically illustrating the positioning of the first torus support assemblies 49 radially arranged about the opening 47 of the base 43 and the first torus drive assembly 72 which engages the toroidal flexible shaft 64, not shown. The second torus support and drive assemblies 85 are radially disposed outward from the assemblies 49 and disposed on a radius lying between adjacent assemblies 49. A second torus drive assembly 131 is disposed between adjacent support assemblies 85 and is in operative engagement with a toroidal flexible shaft 95, not shown.

Figure 4:
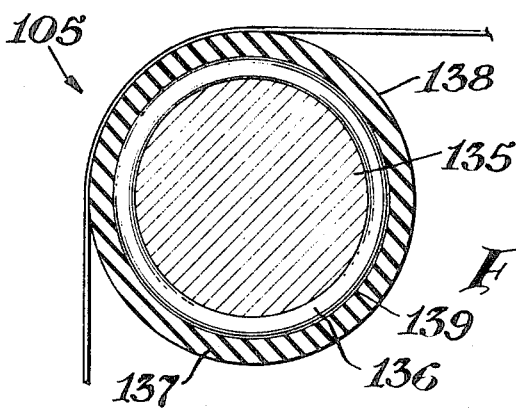
FIG. 4 is a sectional view through a torus employed in the apparatus of FIG. 2.

In FIG. 4 there is depicted a sectional view of the torus 105 which, in matters other than dimension, is substantially identical to a sectional view of the first torus 67. The torus 105 comprises a rigid core 135. The core 135 is a rigid torus such as steel and forms a static mandrel. A plurality of bearings or rings 136 are disposed about the core or mandrel 135 and are a free sliding fit thereon. A sheath 137 having the configuration of a hollow torus is disposed over the core 135 and the bearings or rings 136. The sheath 137 has an outer film engaging surface 138 and an inner or bearing engaging surface 139. The sheath 137 is an elastomeric material beneficially composed of one or more layers of rubber. Oftentimes, it is desirable to form the sheath 137 from two layers of bonded rubber wherein the internal layer is a high strength natural or synthetic rubber such as neoprene which is abrasion resistant and heat resistant, while the outer layer or surface 138 is one of heat resistant silicone or polysiloxane rubber, in order to provide improved heat resistance if the film to be stretched by the apparatus requires relatively high temperatures. The torus of FIG. 4 is one of several varieties which are employed in the practice of the present invention.

Figure 5:
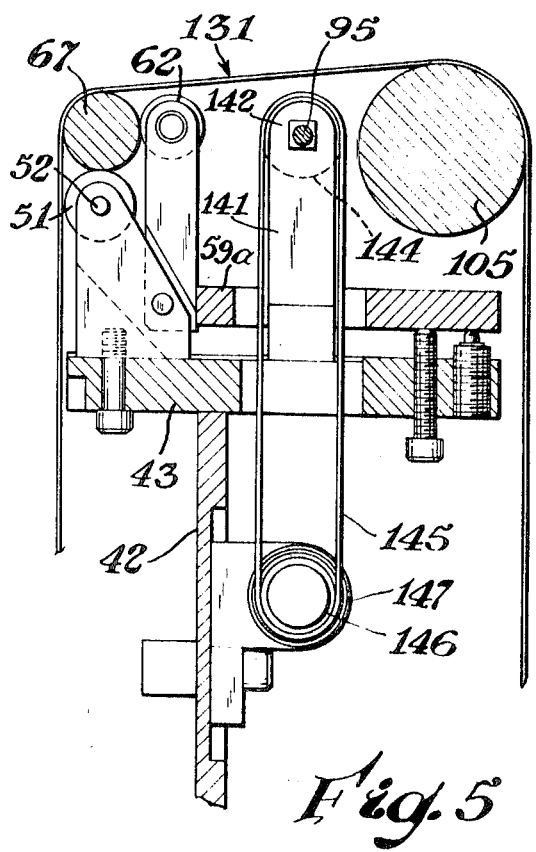
FIG. 5 depicts detail of the drive mechanism of FIG. 2.

In FIG. 5 there is depicted a sectional view of the apparatus 40 of FIG. 2 depicting the second torus drive assembly 131. The drive assembly 131 comprises in cooperative combination a support arm 141 affixed to the base 43. Remote from the base 43 the support arm carries a bearing 142. The bearing 142 supports the flexible toroidal shaft 95. The flexible shaft 95 in turn has affixed thereto a drive means or pulley 144 adapted to rotate in a plane containing the axis of the tube and a radius of the torus. The pulley 144 is in operative engagement with a power transmission means or belt 145. The belt 145 in turn is driven by a pulley 146 affixed to a driving means or gear head motor 147 adjustably secured to the body 42. An arm 59a of the first torus support assembly beneficially is provided with an opening 148 to pass the belt 145 and the support 141.

Figure 6:
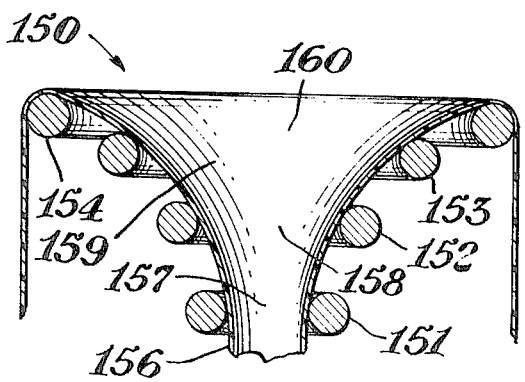
FIG. 6 is a schematic representation of an alternate arrangement of tori in accordance with the present invention.

In FIG. 6 there is depicted a sectional view of a schematic representation of an alternate embodiment of the invention generally designated by the reference numeral 150. The embodiment 150 comprises a first torus 151, a second torus 152 coaxial with and generally adjacent to the torus 151, a third torus 153 coaxial with and adjacent to the torus 152, a fourth torus 154 coaxial with and adjacent to the torus 153. The tori 151, 152, 153 and 154 are of successively increasing diameter and are axially spaced from each other to form a generally bell-shaped configuration. (For the sake of clarity, drive means, heaters and the like are omitted.) A tubular film 156 enters a space 157 defined by the first torus 151, is passed through spaces 158, 159 and 160 defined by the tori 152, 153 and 154, respectively. The film tube 156 is stretched outwardly in a generally bell-shaped configuration thereby providing zones of varying machine direction and transverse direction stretch between adjacent tori. The tori 151, 152, 153 and 154 each have a surface which is rotatable in a manner similar to the rotation of the tori 67 and 105 of FIG. 2.

Figure 7:
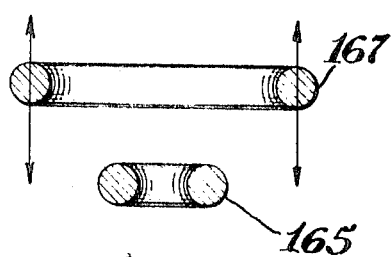
FIG. 7 is a schematic arrangement of an alternate embodiment of the invention.

In FIG. 7 there is depicted an alternate arrangement of tori of the present invention. A first or small torus 165 is disposed coaxially with respect to a second torus 167, the tori 165 and 167 being selectively positioned along their axes of generation as indicated by the double-headed arrows. Such an embodiment provides a means to vary the machine and the transverse direction orientation imparted to a tube being treated and to provide a longer temperature control zone.

In the embodiment of the present invention as depicted in FIGS. 2-5, a tube of material to be stretched is passed upwardly within the passageway 47, over the first torus 67, over the second torus 105 and downwardly toward the slitting knife 123. The first torus 67 is caused to rotate in the direction indicated by the arrow by the drive rolls 62 affixed to the toroidal flexible shaft 64, thus causing the tube to be drawn upwardly and outwardly by frictional engagement with the surface of the torus 67. In a similar manner, the drive means 131 rotates the toroidal flexible shaft 95 causing the drive roll 97 to rotate the second torus 105 in the direction indicated by the arrows. The torus 105 is also in frictional engagement with the film. As the surface speeds of the first and second tori are independently variable, the tube is caused to be stretched in a desired manner in the zone generally indicated by the reference numeral 70a of FIG. 2. Applying appropriate heat to the film from the heaters 108, 109, 110, 111 and 112, stretching conditions are obtained which are optimum for obtaining the desired film characteristics and are independent of the melt strength of the tube being extruded.

In the embodiment depicted in FIGS. 2-5, each of the powered tori are retained in position by rolls spaced slightly more than 90° about the circle of generation and inwardly tensioned to retain the torus 67 and outwardly tensioned to retain the second torus 105. The pressure on the tori from the film being stretched also serves to maintain the tori in frictional engagement with their respective drive rolls. In specific instances, a spacing of less than 90° is satisfactory where relatively heavy film or sheet is being prepared and the pressure exerted on the tori is sufficient to maintain the tori in engagement with the drive and idler rolls. In certain instances, it is advantageous to offset the supporting or drive rolls slightly from a radial configuration in such a manner that a component of motion is introduced to one or both of the tori causing them to rotate about their axes of generation as well as causing the surfaces of the tori to rotate about their circles of generation. Rotation of the tori about the axes of generation is oftentimes advantageous in distributing minor defects or irregularities in the film and will cause such defects or irregularities to be uniformly distributed along the length of the mill roll onto which the resultant film is being wound. A distribution of irregularities along the roll is frequently referred to as randomization.

Apparatus in accordance with the present invention is readily constructed employing conventional materials and modes of construction. The toroidal flexible shafts such as the shafts 64 and 95 beneficially are prepared from conventional readily available flexible shafting. In order to assure that the tori are driven in a uniform manner, particularly when a relatively thin elastomeric skin is employed, the toroidal flexible shafts should be relatively stiff in torsion; that is, angular deviation of a portion of flexible shafting employed to make the tori should be minimal when torque is applied to one end and the opposite end of the shafting restrained from rotational movement.

Tori suitable for the practice of the present invention can be fabricated by means other than the particular arrangement designated in FIG. 4. For example, a torus is readily prepared using a rotating mandrel rather than a static mandrel by utilizing a helical spring disposed within an elastomeric tube such as neoprene rubber and/or polysiloxane or silicone rubber. The helical spring is bent to form a torus, the ends joined and subsequently forming a butt joint by suitable adhesives in the silicone or neoprene tube. Alternately, the bearings 136 may be replaced with a metal ring of generally toroidal configuration prepared of steel or brass and a suitable lubricant disposed within the elastomeric sheath prior to vulcanization or sealing of the ends. Advantageously, a mandrel that rotates with the outer sheath is readily prepared from sheet metal bellows which are bent to form a generally toroidal configuration. Generally, when a bellows, helical spring or the like is employed, the number of turns in a helix or corrugations in the bellows relative to the diameter must be selected to provide adequate support for the outer sheath to maintain the torus of generally constant dimension or under pressure from a film being stretched.

By way of further illustration, employing an apparatus generally as depicted in FIGS. 2–5, the following synthetic resinous tubes are oriented to provide oriented film having characteristics similar to those obtained by tentering: polystyrene, polypropylene, a copolymer of 85 weight percent vinyl chloride and 15 weight percent vinylidene chloride, nylon 6, nylon 66, a copolymer of 25 weight percent acrylonitrile and 75 weight percent styrene, a copolymer of 60 weight percent styrene and 40 weight percent acrylonitrile, polyethylene terephthalate, chlorinated polyethylene containing about 28 weight percent chlorine, a high desity or linear polyethylene, polyvinyl chloride. Employing the apparatus of the present invention, the extruded tubes are readily oriented over a wide variety of conditions, many of such conditions not being feasible with the conventional trapped bubble process.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What we claim is:

1. An apparatus for the biaxial stretching of deformable tubes, the apparatus comprising in cooperative combination at least
   a first torus and
   a second torus, the first torus having a lesser diameter than the second torus, each torus having
      a surface,
      an axis of generation and
      a circle of generation, the first and second tori having generally coaxial axes of generation, and
      means to rotate the tori about the circle of generation, wherein the rotation of the surface has a component of motion lying in a plane containing the axes of generation.

2. The apparatus of claim 1 including means to slit a tube disposed generally adjacent the second torus.

3. The apparatus of claim 1 wherein means to rotate the surfaces of the tori comprise a plurality of rolls adapted to frictionally engage the surface of the tori.

4. The apparatus of claim 1 wherein at least one of the tori comprises a toroidal core, a toroidal sheath disposed about the toroidal core and spaced therefrom by friction reducing means.

5. The apparatus of claim 4 wherein the toroidal core is rigid.

6. The apparatus of claim 4 wherein the friction reducing means comprises a plurality of rings disposed about the core.

7. The apparatus of claim 1 including means to introduce a component of motion to the surface of at least one of the tori about its axis of generation.

8. The apparatus of claim 1 including means to selectively heat a tube disposed generally adjacent the tori.

References Cited
UNITED STATES PATENTS

| | | | |
|---|---|---|---|
| 3,074,108 | 1/1963 | Wiley et al. | 18—14 |
| 3,160,918 | 12/1964 | Berggren et al. | 18—14 |

FRANK T. YOST, Primary Examiner

U.S. Cl. X.R.

264—209, 290